United States Patent
Oh et al.

(10) Patent No.: US 11,600,442 B2
(45) Date of Patent: Mar. 7, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Won Kuen Oh, Suwon-si (KR); Hye Hun Park, Suwon-si (KR); Gyu Ho Yeon, Suwon-si (KR); Sung Hyun Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/474,488

(22) Filed: Sep. 14, 2021

(65) Prior Publication Data

US 2022/0208460 A1 Jun. 30, 2022

(30) Foreign Application Priority Data

Dec. 31, 2020 (KR) .................. 10-2020-0189785

(51) Int. Cl.
*H01G 4/232* (2006.01)
*H01G 4/30* (2006.01)
*H01G 4/248* (2006.01)

(52) U.S. Cl.
CPC ........... *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| 10,573,460 | B2 * | 2/2020 | Bang | H01G 4/248 |
| 2019/0385797 | A1 * | 12/2019 | Bang | H01G 4/012 |
| 2021/0065980 | A1 * | 3/2021 | Jung | H01G 4/232 |
| 2021/0217561 | A1 * | 7/2021 | Yun | H01G 4/30 |
| 2022/0208460 | A1 * | 6/2022 | Oh | H01G 4/30 |

FOREIGN PATENT DOCUMENTS

| CN | 100385583 C | * | 4/2008 | ......... C04B 35/465 |
| JP | H08-330173 A | | 12/1996 | |
| JP | 2019-067828 A | | 4/2019 | |
| KR | 2019116183 A | * | 10/2019 | ............ H01G 4/005 |

* cited by examiner

*Primary Examiner* — Dion R. Ferguson
(74) *Attorney, Agent, or Firm* — Morgan, Lewis & Bockius LLP

(57) ABSTRACT

A multilayer ceramic electronic component including: a ceramic body including a dielectric layer and first and second internal electrodes; a first external electrode including a first base electrode disposed to be in contact with the ceramic body and a first conductive layer disposed on the first base electrode; and a second external electrode including a second base electrode disposed to be in contact with the ceramic body and a second conductive layer disposed on the second base electrode, wherein the first conductive layer and the second conductive layer include silver (Ag) and palladium (Pd) and distribution positions of silver (Ag) and palladium (Pd) in central portions of the first conductive layer and the second conductive layer match at 95% or more according to a result of TEM mapping.

18 Claims, 13 Drawing Sheets
(6 of 13 Drawing Sheet(s) Filed in Color)

A

| CLASSIFICATION | 0 SECOND | 10 SECOND | 30 SECOND | 60 SECOND | 120 SECOND | 180 SECOND |
|---|---|---|---|---|---|---|
| COMPARATIVE EXAMPLE | | | | | | |
| EXAMPLE | | | | | | |

MULTILAYER CERAMIC ELECTRONIC COMPONENT

CROSS-REFERENCE TO RELATED APPLICATION

This application claims the benefit of priority to Korean Patent Application No. 10-2020-0189785 filed on Dec. 31, 2020 in the Korean Intellectual Property Office, the disclosure of which is incorporated herein by reference in its entirety.

TECHNICAL FIELD

The present disclosure relates to a multilayer ceramic electronic component.

BACKGROUND

In recent years, as an application area of electronic products has expanded, a technical field in which multilayer ceramic electronic components are used has also expanded. In particular, a structure in which an electronic control unit (ECU) or a transmission control unit (TCU) of a vehicle is disposed in an engine compartment or directly attached to a transmission is used as vehicles are electronicized.

However, when existing multilayer ceramic electronic components are applied to a harsh environment such as high temperature and high vibration environment, expansion and contraction due to high/low temperature cycles are repeated to cause continuous mechanical stress. In addition, application of the continuous mechanical stress is a major cause of cracking in terminal electrodes or solder.

In order to solve this problem, a method of using a conductive adhesive other than solder has been proposed. The conductive adhesive used for vehicle electrical equipment is generally used by mixing a conductive metal with a base resin such as an epoxy resin. The use of a conductive adhesive may alleviate cracks due to mechanical stress because the base resin has a higher modulus of elasticity than that of solder.

However, in spite of the use of a conductive adhesive is used, repeated exposure to a high temperature/high humidity environment increases a possibility of ion migration in external electrodes of a multilayer ceramic electronic component. Such ion migration is a major cause of deteriorating reliability of multilayer ceramic electronic components. In addition, if a noble metal such as palladium (Pd) is used to suppress ion migration, cost of a product itself may be excessively high.

SUMMARY

An aspect of the present disclosure may provide a multilayer ceramic electronic component capable of suppressing ion migration.

An aspect of the present disclosure may also provide a multilayer ceramic electronic component having improved economic efficiency by reducing the usage of a noble metal.

An aspect of the present disclosure may also provide a multilayer ceramic electronic component having excellent reliability.

According to an aspect of the present disclosure, a multilayer ceramic electronic component including: a ceramic body including a dielectric layer and first and second internal electrodes alternately stacked with the dielectric layer interposed therebetween; a first external electrode connected to the first internal electrode and including a first base electrode disposed to be in contact with the ceramic body and a first conductive layer disposed on the first base electrode; and a second external electrode connected to the second internal electrode and including a second base electrode disposed to be in contact with the ceramic body and a second conductive layer disposed on the second base electrode, wherein the first conductive layer and the second conductive layer include silver (Ag) and palladium (Pd), and distribution positions of silver (Ag) and palladium (Pd) in central portions of the first conductive layer and the second conductive layer match at 95% or more according to a result of TEM mapping.

BRIEF DESCRIPTION OF DRAWINGS

The patent or application file contains as least one drawing executed in color. Copies of this patent or patent application publication with color drawing(s) will be provided by the Office upon request and payment of the necessary fee.

The above and other aspects, features and other advantages of the present disclosure will be more clearly understood from the following detailed description taken in conjunction with the accompanying drawings, in which.

DETAILED DESCRIPTION

Figure 1:
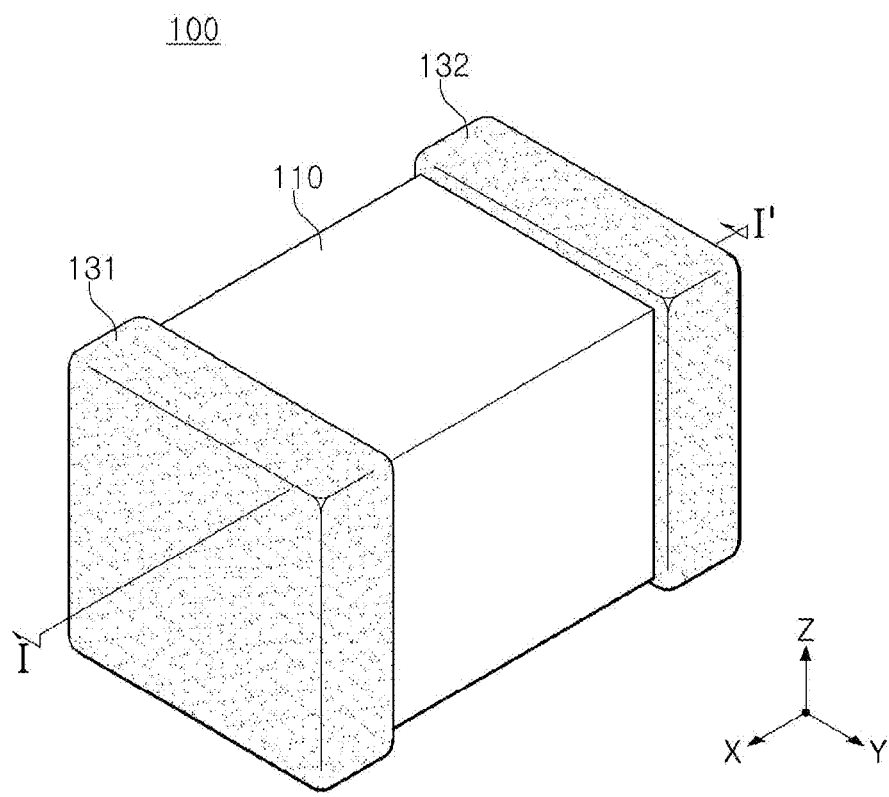
FIG. 1 is a perspective view schematically illustrating a multilayer ceramic electronic component according to an exemplary embodiment in the present disclosure.

Exemplary embodiments of the present disclosure will now be described in detail with reference to the accompanying drawings. The shape and size of constituent elements in the drawings may be exaggerated or reduced for clarity. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations and propose only a required configuration herein, but are not limited thereto.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Figure 2:
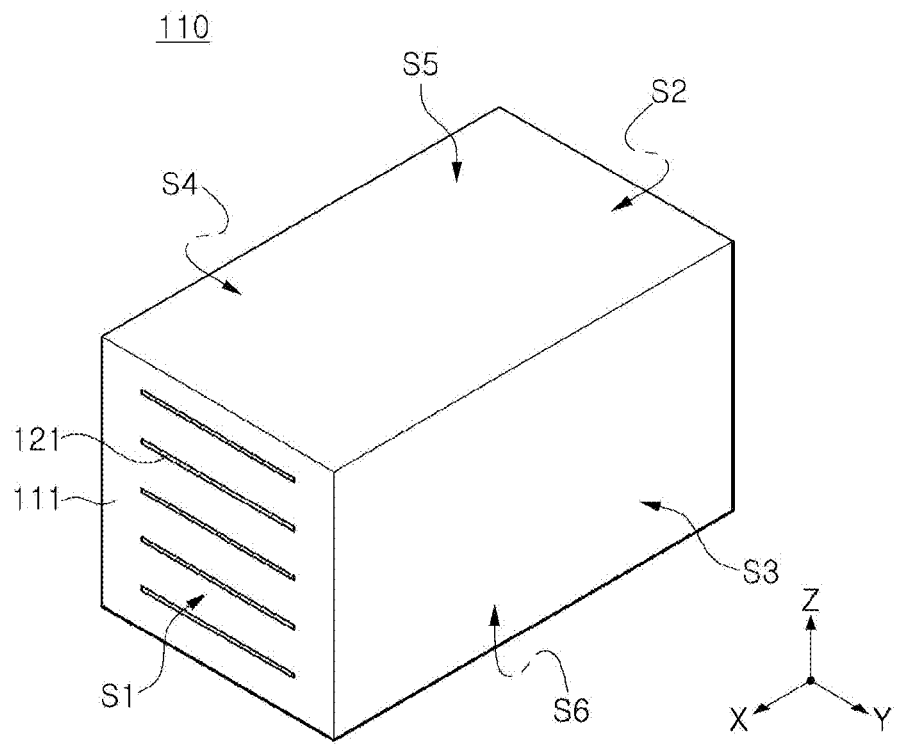
FIG. 2 is a perspective view schematically illustrating a ceramic body of FIG. 1.
Figure 3:
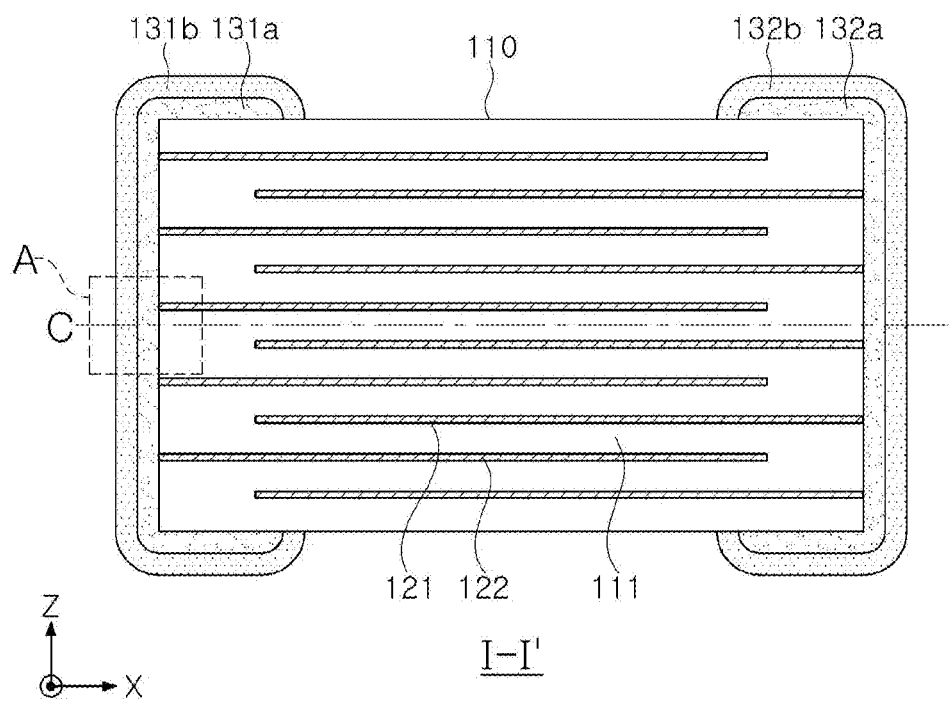
FIG. 3 is a cross-sectional view taken along line I-I' of FIG. 1.
Figure 4:
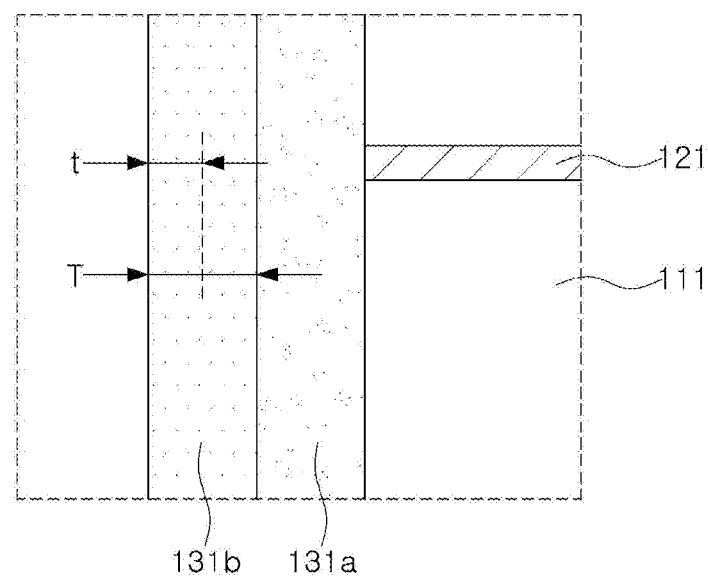
FIG. 4 is an enlarged view of region A of FIG. 3.

FIG. 1 is a perspective view schematically illustrating a multilayer ceramic electronic component according to an exemplary embodiment in the present disclosure, FIG. 2 is a perspective view schematically illustrating a ceramic body of the multilayer ceramic electronic component, FIG. 3 is a cross-sectional view taken along line I-I' of FIG. 1, and FIG. 4 is an enlarged view of a region A of FIG. 3.

Hereinafter, a multilayer ceramic electronic component according to an exemplary embodiment will be described in detail with reference to FIGS. 1 through 4.

Referring to FIGS. 1 through 4, a multilayer ceramic electronic component 100 according to an exemplary embodiment in the present disclosure includes a ceramic body 110 including a dielectric layer 111 and first and second internal electrodes 121 and 122 alternately stacked with the dielectric layer 111 interposed therebetween; a first external electrode 131 connected to the first internal electrode 121 and including a first base electrode 131a disposed to be in contact with the ceramic body 110 and a first conductive layer 131b disposed on the first base electrode 131a; and a second external electrode 132 connected to the second internal electrode 122 and including a second base electrode 132a disposed to be in contact with the ceramic body 110 and a second conductive layer 132b disposed on the second base electrode 132a.

Here, the first conductive layer 131b and the second conductive layer 132b include silver (Ag) and palladium (Pd) and distribution positions of silver (Ag) and palladium (Pd) in central portions of the first conductive layer 131b and the second conductive layer 132b may match at 95% or more according to a result of TEM mapping.

In the present disclosure, the "central portion" of the first conductive layer 131b and the second conductive layer 132b may refer to a portion in which a thickness of ½×T, when an average thickness of the first conductive layer 131b and/or the second conductive layer 132b in the first direction (X direction) is T. Referring to FIG. 4, the central portion of the first conductive layer 131b and the second conductive layer 132b may be a position by grinding the first conductive layer 131b and/or the second conductive layer 132b by t in the first direction (X direction). Here, t=½×T. Also, the central portion may refer to a region having a square shape of 50 μm×50 μm based on a central axis C of the multilayer ceramic electronic component 100 according to the present disclosure in the first direction (X direction). That is, the center of the region of 50 μm×50 μm and the central axis C of the multilayer ceramic electronic component 100 in the first direction (X direction) may match.

In the multilayer ceramic electronic component according to the present disclosure, distribution positions of silver (Ag) and palladium (Pd) may match at 95% or more according to a result of TEM mapping in the central portions of the first conductive layer 131b and the second conductive layer 132b. The distribution positions of the silver (Ag) and palladium (Pd) may be checked by analyzing the distribution positions of silver (Ag) and palladium (Pd) through an image analysis program (e.g., Image Pro Plus ver 4.5 by Mediacybernetics) after imaging the central portions of the first conductive layer 131b and/or the second conductive layer 132b with a transmission electron microscope (TEM), etc.

The distribution positions of silver (Ag) and palladium (Pd) in the central portions of the first conductive layer 131b and the second conductive layer 132b may be 95% or more, 96% or more, 97% or more, 98% or more, or 99% or more, and an upper limit is not particularly limited, but may be, for example, 100% or less. Matching of the distribution positions of silver (Ag) and palladium (Pd) in the central portions of the first conductive layer 131b and the second conductive layer 132b may indicate that silver (Ag) and palladium (Pd) do not separately exist as separate components but are disposed in the form of a single component inside the conductive layers. That is, the coincidence of the distribution positions of silver (Ag) and palladium (Pd) may mean that silver (Ag) and palladium (Pd) exist in an alloy phase. In the multilayer ceramic electronic component according to the present disclosure, a coincidence ratio of the distribution ranges of silver (Ag) and palladium (Pd) in the central portions of the first conductive layer 131b and the second conductive layer 132b satisfies the above range, thereby effectively suppressing ion migration of the external electrodes.

The multilayer ceramic electronic component 100 according to an exemplary embodiment in the present disclosure may include the dielectric layer 111 and the first and second internal electrodes 121 and 122 alternately stacked with the dielectric layer 111 interposed therebetween.

The ceramic body 110 of the multilayer ceramic electronic component 100 according to the present disclosure may include the dielectric layer 111 and the first and second internal electrodes 121 and 122 disposed to be stacked in the third direction (Z direction) with the dielectric layer 111 interposed therebetween.

There is no particular limitation on a specific shape of the ceramic body 110, but as shown, the ceramic body 110 may have a hexahedral shape or a similar shape. Due to the shrinkage of the ceramic powder contained in the ceramic body 110 during a sintering process, the ceramic body 110 may have a substantially hexahedral shape, although it is not a hexahedral shape having a complete straight line. If necessary, the ceramic body 110 may be rounded so that the corners are not angled. The rounding treatment may be, for example, barrel polishing, but is not limited thereto.

In the ceramic body 110, the dielectric layer 111, the first internal electrode 121, and the second internal electrode 122 may be alternately stacked. The dielectric layer 111, the first internal electrode 121, and the second internal electrode 122 may be stacked in the third direction (Z direction). The plurality of dielectric layers 111 are in a sintered state, and adjacent dielectric layers 111 may be integrated such that boundaries therebetween may not be readily apparent without using a scanning electron microscope (SEM).

According to an exemplary embodiment in the present disclosure, the dielectric layer 111 may include a component represented by $(Ba_{1-x}Ca_x)(Ti_{1-y}(Zr, Sn, Hf)_y)O_3$ (here, $0 \leq x \leq 1$ and $0 \leq y \leq 0.5$). The component may be, for example, a compound in which Ca, Zr, Sn and/or Hf is partially dissolved in $BaTiO_3$. In the above compositional formula, x may be in the range of 0 or more and 1 or less and y may be in the range of 0 or more and 0.5 or less, but is not limited thereto. For example, when x is 0, y is 0, in the above compositional formula, the component may be $BaTiO_3$. In addition, various ceramic additives, organic solvents, plasticizers, binders, dispersants, and the like may be added to the component according to the purpose of the present disclosure The dielectric layer 111 may be formed by adding an additive as necessary to a slurry containing the aforementioned material, applying slurry on a carrier film, and drying the slurry to prepare a plurality of ceramic sheets. The ceramic sheet may be formed by fabricating the slurry into a sheet type having a thickness of several pm by a doctor blade method, but is not limited thereto.

The ceramic body 110 may be formed by alternately stacking a ceramic green sheet in which the first internal electrode 121 is printed on the dielectric layer 111 and a ceramic green sheet in which the second internal electrode 122 is printed on the dielectric layer 111 in the third direction (Z direction). A printing method of the first and second internal electrodes may be a screen printing method or a gravure printing method, but is not limited thereto.

The first and second internal electrodes 121 and 122 may be stacked so that cross sections thereof are exposed to opposing ends of the ceramic body 110, respectively. Specifically, the first and second internal electrodes 121 and 122 may be exposed to both surfaces of the ceramic body 110 in the first direction (X direction), respectively, and in this case, the first internal electrode 121 may be exposed in a direction of the first surface S1 of the ceramic body 110 and the second internal electrode 122 may be exposed in a direction of the second surface S2 of the ceramic body 110.

The first and second internal electrodes 121 and 122 may include a conductive metal. The conductive metal may include, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb) and may include one or more conductive metals of these alloys. The first and second internal electrodes 121 and 122 may be formed using a conductive paste containing the conductive metal.

The multilayer ceramic electronic component 100 according to the present disclosure may include the first external electrode 131 including a first base electrode 131a connected to the first internal electrode 121 and disposed to be in contact with the ceramic body 110 and a first conductive layer 131b disposed on the first base electrode 131a and the second external electrode 132 including a second base electrode 132a connected to the second internal electrode 122 and disposed to be in contact with the ceramic body 110 and a second conductive layer 132b disposed on the second base electrode 132a. The first base electrode 131a may be disposed on the first surface S1 of the ceramic body 110 and the second base electrode 132a may be disposed on the second surface S2 of the ceramic body 110.

In an exemplary embodiment in the present disclosure, the first base electrode 131a and the second base electrode 132a of the multilayer ceramic electronic component according to the present disclosure may include a conductive metal. The conductive metal may include at least one of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof.

As an example of a method of forming the first and second base electrodes 131a and 132a, the first and second base electrodes 131a and 132a may be formed by dipping a ceramic body in a conductive paste including a conductive metal and sintering the ceramic body or may be formed by printing the conductive paste on a surface of a ceramic body through a screen printing method or a gravure printing method and sintering the ceramic body. In addition, the first and second base electrodes 131a and 132a may be formed by applying the conductive paste to a surface of the ceramic body or by transferring a dry film obtained by drying the conductive paste on a ceramic body and subsequently sintering the ceramic body, but the method is not limited thereto. For example, the first and second base electrodes 131a and 132a may be formed by forming a conductive paste on a ceramic body according to various other methods than the aforementioned methods and then sintering the ceramic body.

Figure 5:
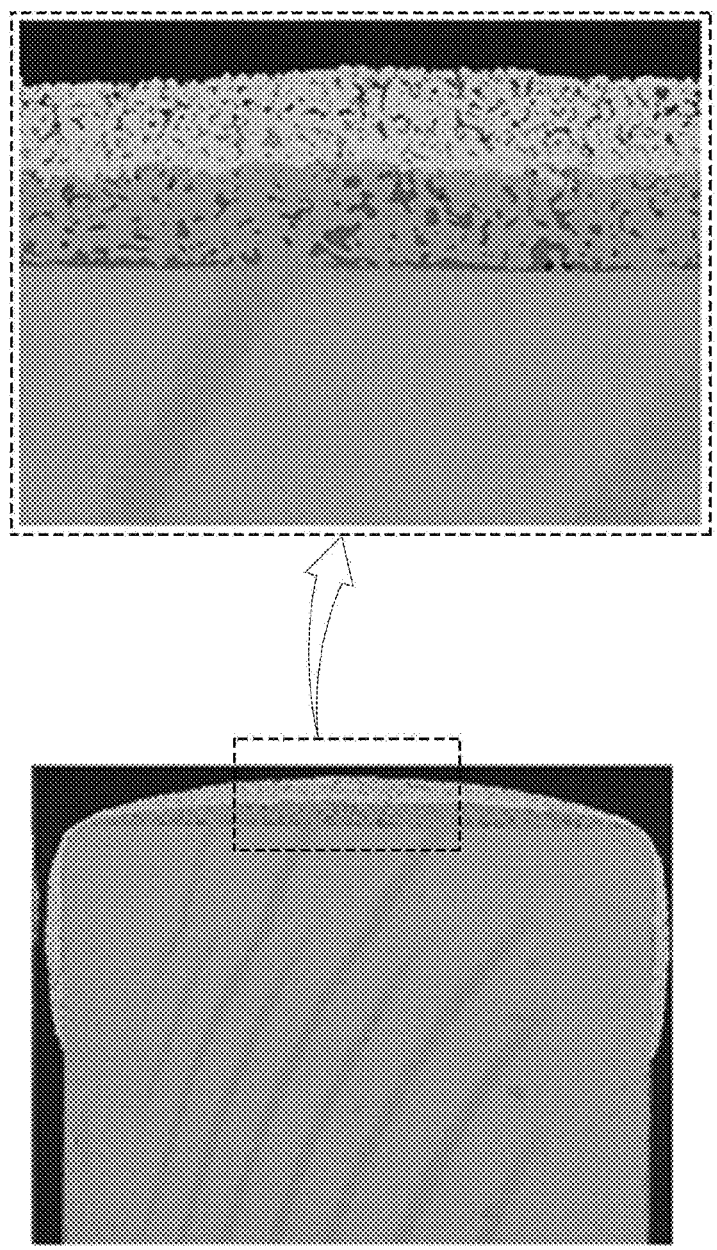
FIG. 5 is an SEM image of a cross-section of a multilayer ceramic electronic component according to an exemplary embodiment in the present disclosure.

The multilayer ceramic electronic component 100 according to the present disclosure may include the first conductive layer 131b disposed on the first base electrode 131a and the second conductive layer 132b disposed on the second base electrode 132a. FIG. 5 is an image of a cross-section of a first external electrode of a multilayer ceramic electronic component according to the present disclosure. Referring to FIG. 5, it can be seen that the first external electrode of the multilayer ceramic electronic component according to the present disclosure has a structure in which the first conductive layer 131b is disposed on the first base electrode 131a.

In an example of the present disclosure, the first conductive layer 131b and the second conductive layer 132b of the multilayer ceramic electronic component 100 according to the present disclosure may include an alloy of silver (Ag) and palladium (Pd). In this case, an average alloying rate of silver (Ag) and palladium (Pd) of the first conductive layer 131b and the second conductive layer 132b may be 95% or more. In the present disclosure, the term "alloying rate" may refer to a ratio (B/A) of a weight B of an alloy of silver (Ag) and palladium (Pd) to the sum weight A of a weight of entire silver (Ag) and a weight of entire palladium (Pd) included in the first conductive layer 131b and/or the second conductive layer 132b described above. The sum weight A of the weight of the entire silver (Ag) and the weight of the entire palladium (Pd) and the weight B of the alloy of silver (Ag) and palladium (Pd) may be obtained by analyzing an image of a TEM-EDS mapping result for the central portions of the first conductive layer 131b and/or the second conductive layer 132b as described above. In addition, in the present disclosure, the "average" alloying rate may refer to an arithmetic average of the alloying rates of samples taken from any five locations at the central portion of the first conductive layer 131b and/or the second conductive layer 132b.

Figure 6:
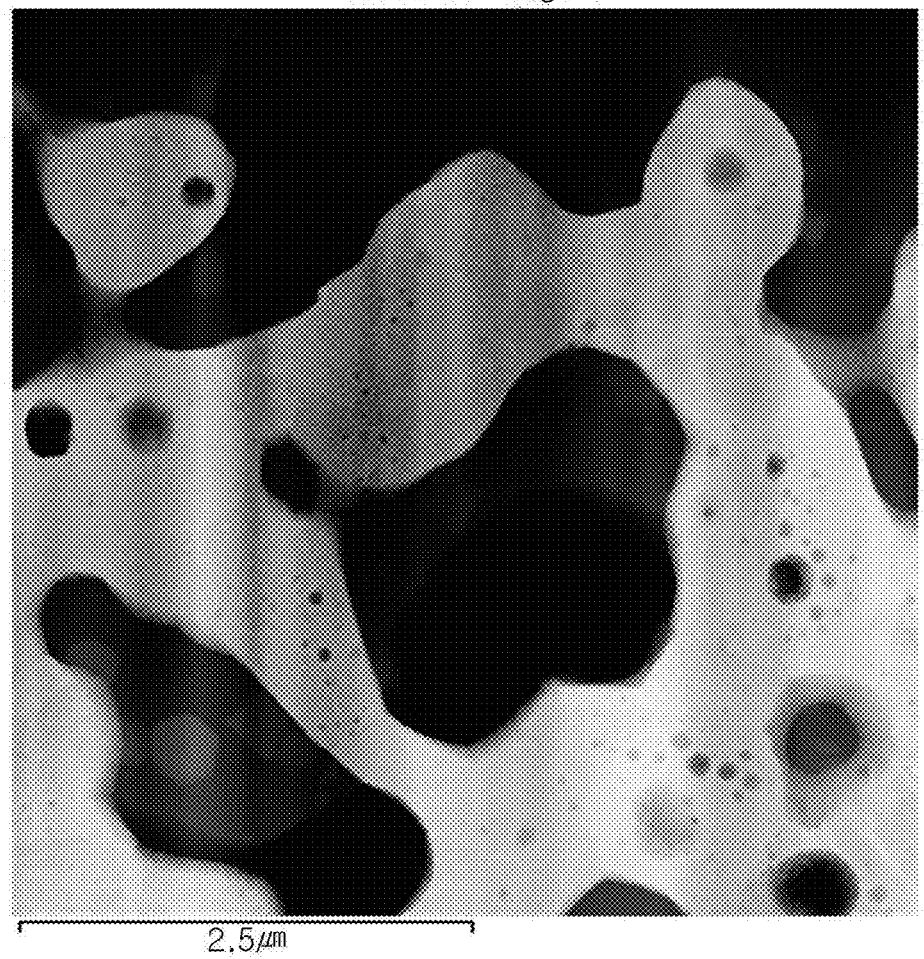
FIG. 6 is a TEM image of a cross-section of a multilayer ceramic electronic component according to an exemplary embodiment in the present disclosure.
Figure 7A:
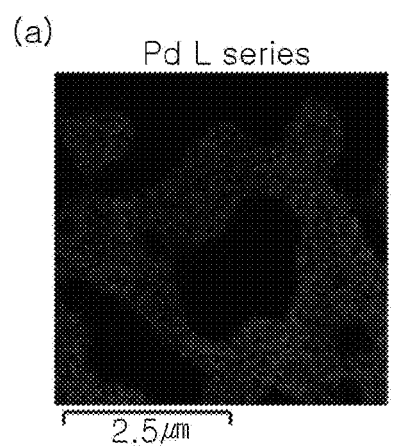
FIG. 7A and FIG. 7A respectively illustrate energy dispersive spectroscopy (EDS) mapping images for palladium (Pd) and silver (Ag) with respect to the image of FIG. 6.
Figure 7B:
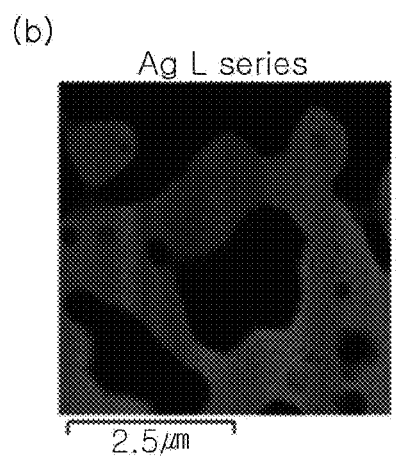

The average alloying rate of silver (Ag) and palladium (Pd) may be 95% or more, 96% or more, 97% or more, 98% or more, or 99% or more, and an upper limit thereof is not particularly limited, but may be, for example, 100% or less. If the average alloying rate of silver (Ag) and palladium (Pd) is 100%, both silver (Ag) and palladium (Pd) included in the first conductive layer 131b and/or the second conductive layer 132b may be included as alloys. FIGS. 6 and 7 are TEM images of the central regions of the first conductive layer 131b and/or the second conductive layer 132b of the multilayer ceramic electronic component according to the present example. As shown in FIG. 6, silver (Ag) and palladium (Pd) of the first conductive layer 131b and/or the second conductive layer 132b may exist in an alloy phase. FIG. 7 shows the result of TEM-EDS mapping of the image of FIG. 6. Referring to FIG. 7A, it can be seen that palladium (Pd) included in the first conductive layer 131b and/or the second conductive layer 132b is distributed in the entire region of the alloy of silver (Ag) and palladium (Pd). In addition, referring to FIG. 7B, palladium (Pd) included in the first conductive layer 131b and/or the second conductive layer 132b is also distributed in the entire region of the alloy of silver (Ag) and palladium (Pd). That is, if the distributions of silver (Ag) and palladium (Pd) match in all regions of FIGS. 7A and 7B, it may mean that both silver (Ag) and palladium (Pd) exist in an alloy phase.

That is, silver (Ag) or palladium (Pd) included in the first conductive layer 131b and/or the second conductive layer 132b of the multilayer ceramic electronic component according to the present example may rarely exist as a separate component other than an alloy. In general, when the external electrode of the multilayer ceramic electronic component is formed, a single component metal may be used, but some alloys are mixed as necessary, and sometimes, different metal components may be controlled to be partially alloyed during firing. In particular, in the case of using a multilayer external electrode, metal components to be included in each layer may be applied to be different in many cases, and different metal components may be controlled to form an intermetallic compound (IMC) at an interface of each layer. That is, the external electrode is formed such that advantageous effects of each component may be utilized. Meanwhile, in the multilayer ceramic electronic component, an alloy of silver (Ag) and palladium (Pd) are used from a raw material stage for forming the first conductive layer 131b and/or the second conductive layer 132b, and thus, even if a small amount of palladium (Pd) is used, an excellent ion migration suppressing effect may be obtained. If the average alloying rate of the first conductive layer 131b and/or the second conductive layer 132b is outside of the above range, there may be a problem in that the silver (Ag) component is migrated when exposed to a high temperature environment.

In one example, the first conductive layer 131b and/or the second conductive layer 132b of the multilayer ceramic electronic component of the present disclosure may not contain palladium (Pd) particles having a maximum particle diameter of 100 nm or more. The palladium (Pd) particle may refer to a single particle including only palladium (Pd). As described above, since the first conductive layer 131b and/or the second conductive layer 132b of the multilayer ceramic electronic component according to the present disclosure uses an alloy of silver (Ag) and palladium (Pd) from the raw material stage, they may have a high alloying rate and may not contain separate palladium (Pd) particles having a predetermined size or greater.

According to an exemplary embodiment in the present disclosure, the alloy of silver (Ag) and palladium (Pd) included in the first conductive layer 131b and/or the second conductive layer 132b of the multilayer ceramic electronic component may include palladium (Pd) satisfying a range of 1 wt % or more and 50 wt % or less. The content of palladium (Pd) contained in the alloy of silver (Ag) and palladium (Pd) may be 1.0 wt % or more, 1.2 wt % or more, 1.4 w % or more, 1.6 wt % or more, 1.8 wt % or more, or 2.0 w % or more and may be 50 w % or less, 45 wt % or less, 40 wt % or less, 35 wt % or less, 30 wt % or less, 25 wt % or less, or 20 wt % or less. In the multilayer ceramic electronic component according to the present disclosure, by applying palladium (Pd), included in the first conductive layer 131b and/or the second conductive layer 132b, in the form of an alloy with silver (Ag) at the raw material stage, ion migration of the first conductive layer 131b and/or the second conductive layer 132b may be effectively suppressed even if a small amount of palladium (Pd) is used, thereby improving economic efficiency.

In an exemplary embodiment in the present disclosure, the alloy of silver (Ag) and palladium (Pd) of the first conductive layer 131b and/or the second conductive layer 132b of the multilayer ceramic electronic component may include a core-shell structure including a core portion and a shell portion. In the core-shell structure of the alloy of silver (Ag) and palladium (Pd), the core portion and the shell portion may have different compositions. In this case, in the core-shell structure, the shell portion may have a higher content ratio of palladium (Pd) than the core portion. FIGS.

Figure 8:
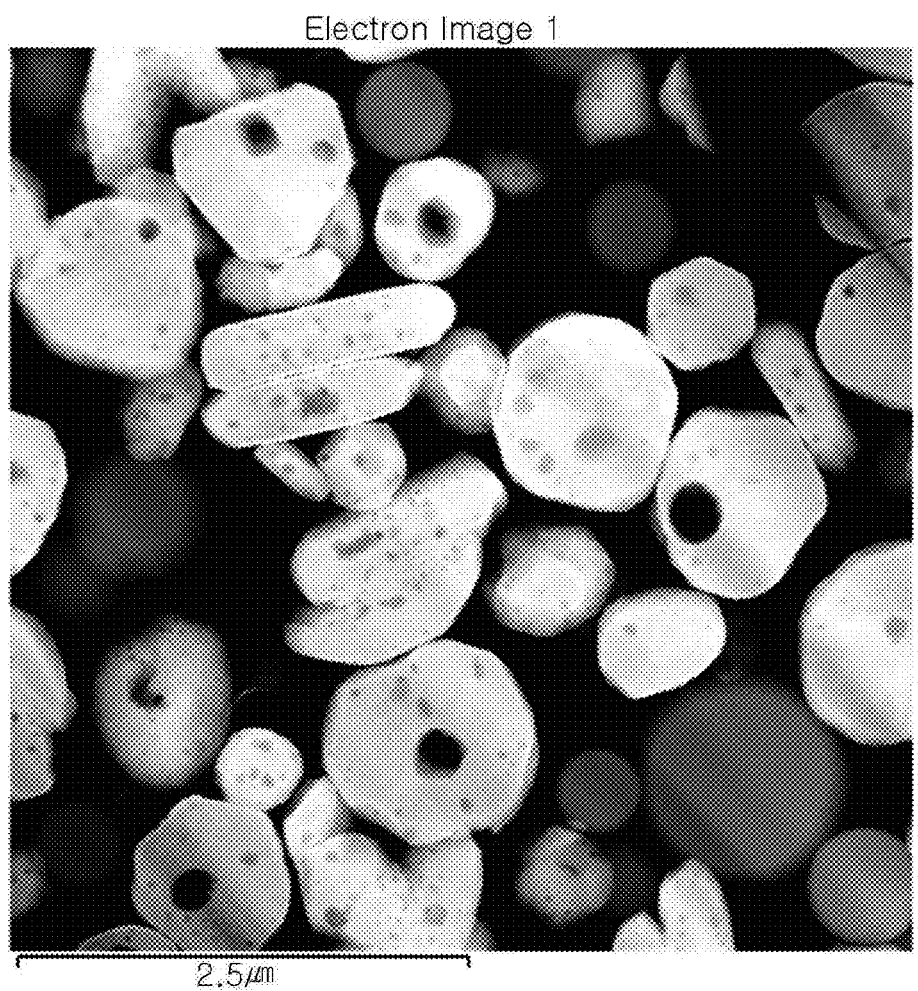
FIG. 8 is a TEM image of a cross-section of a multilayer ceramic electronic component according to another exemplary embodiment in the present disclosure.
Figure 9A:
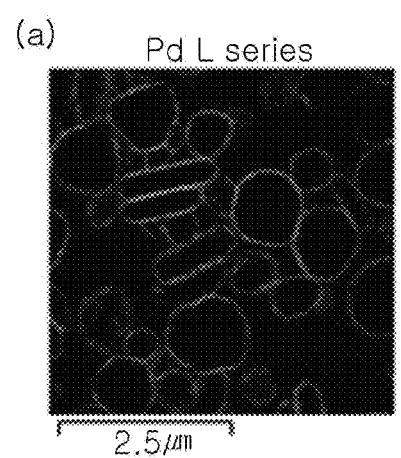
FIG. 9A and FIG. 9B respectively illustrate EDS mapping images for palladium (Pd) and silver (Ag) with respect to the image of FIG. 8.
Figure 9B:
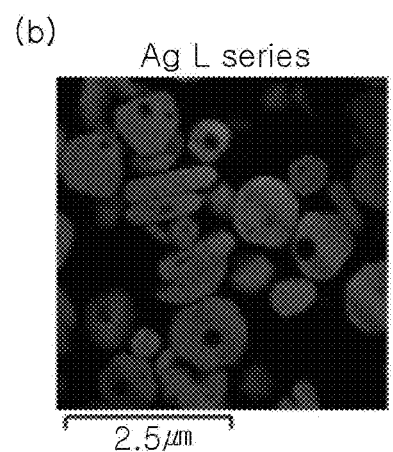

8 and 9 are TEM images of central regions of the first conductive layer 131b and/or the second conductive layer 132b of the multilayer ceramic electronic component according to the present exemplary embodiment. As shown in FIG. 8, silver (Ag) and palladium (Pd) of the first conductive layer 131b and/or the second conductive layer 132b may exist in an alloy phase. FIG. 9 shows a result of TEM-EDS mapping of the image of FIG. 8. Referring to FIG. 9B, it can be seen that silver (Ag) included in the first conductive layer 131b and/or the second conductive layer 132b is distributed in the entire region of the alloy of silver (Ag) and palladium (Pd). Meanwhile, referring to FIG. 9A, it can be seen that palladium (Pd) included in the first conductive layer 131b and/or the second conductive layer 132b is included in a higher ratio in the shell portion. Even when the alloy of silver (Ag) and palladium (Pd) has the core-shell structure as in the present exemplary embodiment, ion migration may be effectively suppressed.

Figure 10A:
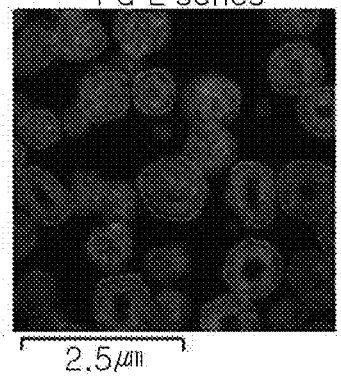
FIG. 10A and FIG. 10B respectively illustrate EDS mapping images for palladium (Pd) and silver (Ag)
Figure 10B:
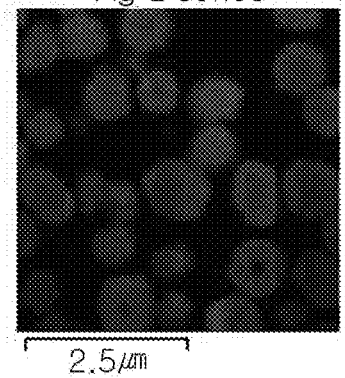
Figure 11:
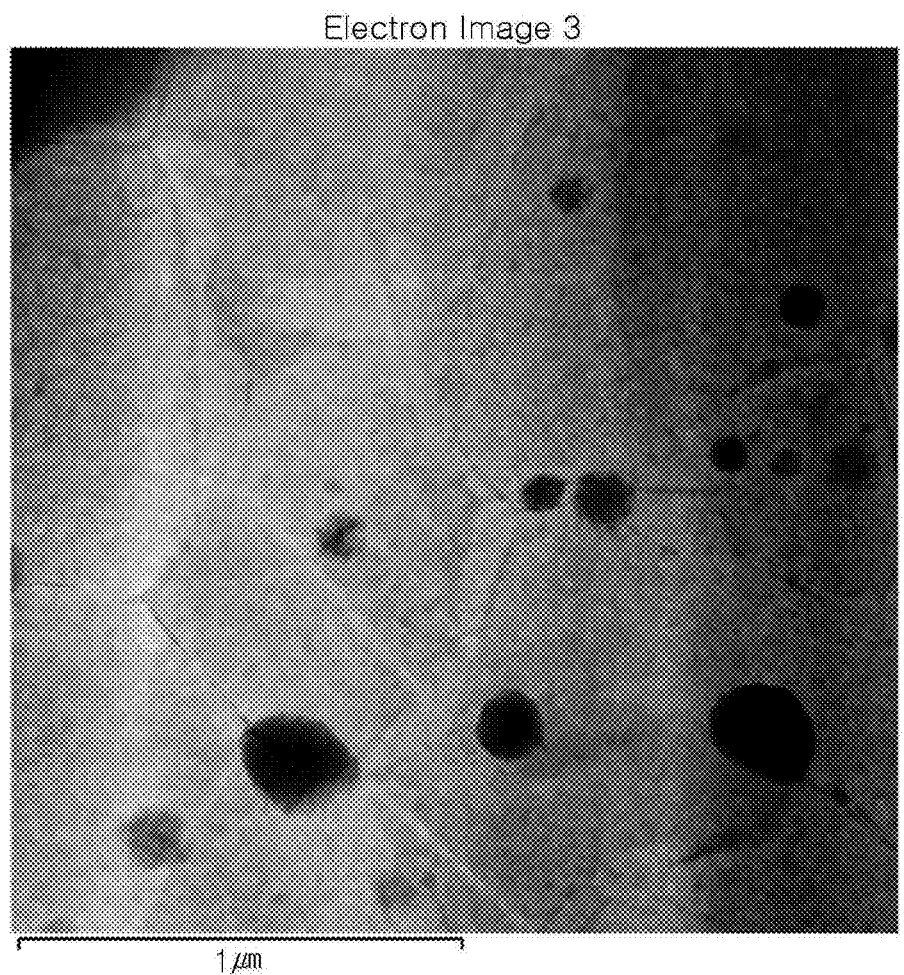
FIG. 11 is a TEM image of a cross-section of a multilayer ceramic electronic component according to Comparative Example of the present disclosure.
Figure 12A:
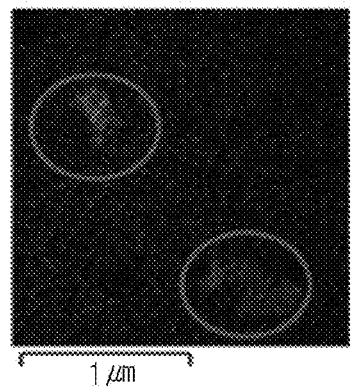
FIG. 12A and FIG. 12B respectively illustrate EDS mapping images for palladium (Pd) and silver (Ag) with respect to the image of FIG. 11.
Figure 12B:
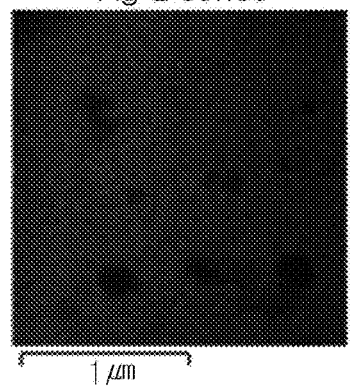
Figure 13:
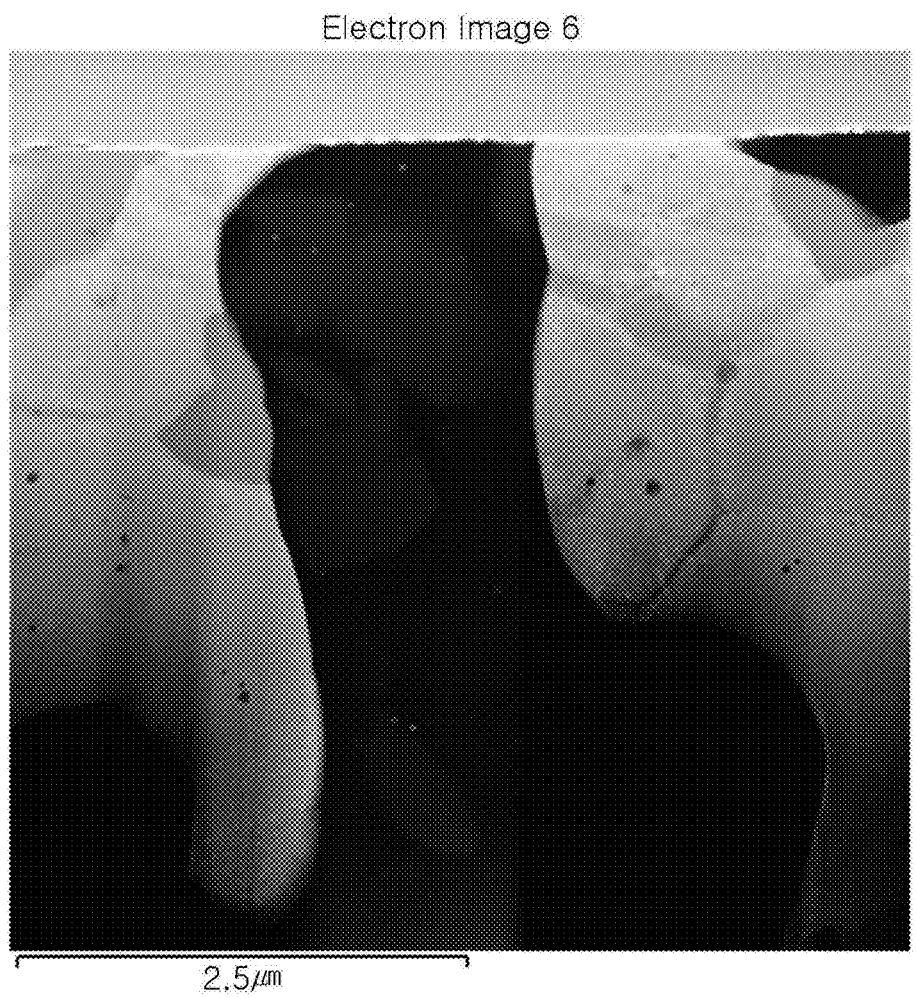
FIG. 13 is a TEM image of a cross-section of a multilayer ceramic electronic component according to a Comparative Example of the present disclosure.
Figure 14A:
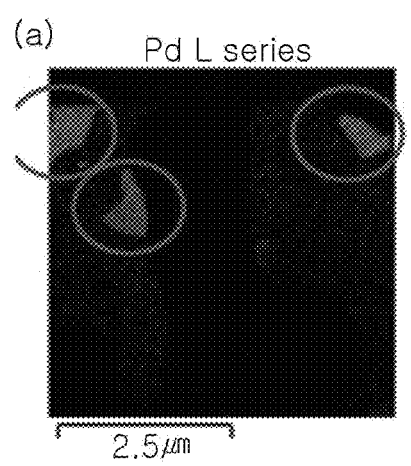
FIG. 14A and FIG. 14B respectively illustrate EDS mapping images for palladium (Pd) and silver (Ag) with respect to the image of FIG. 13.
Figure 14B:
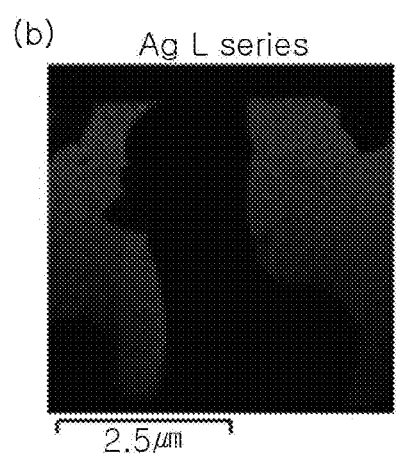

In another exemplary embodiment in the present disclosure, the alloy of silver (Ag) and palladium (Pd) of the first conductive layer 131b and/or the second conductive layer 132b of the multilayer ceramic electronic component may include a homogenous alloy structure. The homogeneous alloy structure may mean that silver (Ag) and palladium (Pd) form an alloy phase evenly without being one-sided to any one region. That is, the homogeneous alloy structure may refer to a state in which an alloying rate is very high. In this case, the content of palladium (Pd) of the homogenous alloy structure may have a certain weight ratio in an alloy region of silver (Ag) and palladium (Pd) of the first and second conductive layers. FIGS. 10A and 10B illustrate the result of TEM-EDS mapping. Referring to FIGS. 10A and 10B, it can be seen that, in the case of the present exemplary embodiment, the alloy of silver (Ag) and palladium (Pd) included in the first conductive layer 131b and/or the second conductive layer 132b is evenly distributed, unlike the case shown in FIG. 9. When the alloy of silver (Ag) and palladium (Pd) has a homoenous structure as in the present exemplary embodiment, excellent ion migration suppressing effect may be obtained.

In an example of the present disclosure, the first conductive layer 131b and the second conductive layer 132b of the multilayer ceramic electronic component according to the present disclosure may include glass. The glass may be a composition in which oxides are mixed, and may be at least one selected from the group consisting of silicon oxide, boron oxide, aluminum oxide, transition metal oxide, alkali metal oxide, and alkaline earth metal oxide, but it not limited thereto. The transition metal may be one or more selected from the group consisting of zinc (Zn), titanium (Ti), copper (Cu), vanadium (V), manganese (Mn), iron (Fe), and nickel (Ni). The alkali metal may be one or more selected from the group consisting of lithium (Li), sodium (Na), and potassium (K), and the alkaline earth metal may be one or more selected from the group consisting of magnesium (Mg), calcium (Ca), strontium (Sr), and barium (Ba).

In one example, the first conductive layer 131b and/or the second conductive layer 132b of the multilayer ceramic electronic component according to the present disclosure may include glass in a range from 5 wt % to 15 wt %. The content of glass in the first conductive layer 131b and/or the second conductive layer 132b may refer to an average value of samples taken from any five locations at the central portion of the first conductive layer 131b and/or the second conductive layer 132b. If the content of glass in the first conductive layer 131b and/or the second conductive layer 132b exceeds 15 w %, density of the first conductive layer 131b and/or the second conductive layer 132b may be lowered to degrade durability of the multilayer ceramic electronic component. In addition, if the content of the glass in the first conductive layer 131b and/or the second conductive layer 132b is less than 5 w %, rheological properties may be degraded, and thus the first conductive layer 131b and/or the second conductive layer 132b may not be manufactured in a desired shape.

A method of forming the first conductive layer 131b and the second conductive layer 132b does not need to be particularly limited. For example, the first conductive layer 131b and the second conductive layer 132b may be formed by dipping a ceramic body in a conductive paste including an alloy of silver A and palladium (Pd) and glass or may be formed by printing the conductive paste on a surface of the ceramic body through a screen printing method or a gravure printing method. Also, the first conductive layer 131b and the second conductive layer 132b may be formed by applying the conductive paste to a surface of the ceramic body or by transferring a dry film obtained by drying the conductive paste onto the ceramic body, but the method is not limited thereto. By forming the first conductive layer 131b and the second conductive layer 132b with the aforementioned conductive paste, sufficient conductivity may be maintained, while density of the external electrode may be increased due to the added glass, thereby effectively suppressing penetration of a plating solution and/or external moisture.

In an exemplary embodiment in the present disclosure, the first conductive layer 131b and the second conductive layer 132b of the multilayer ceramic electronic component according to the present disclosure may be disposed to cover the first and second base electrodes, respectively. In this disclosure, disposing any one layer to cover another layer may refer to a structure in which an internal layer is not exposed to the outside and may refer to a structure in which an internal layer is disposed inside the external layer or in which only the external layer is visible from the outside. When the first and second conductive layers are disposed to cover the first and second base electrodes, respectively, as described above, the first and second conductive layers may prevent the first and second base electrodes from being exposed to the outside, thereby improving moisture resistance reliability of the multilayer ceramic electronic component.

In an exemplary embodiment in the present disclosure, the multilayer ceramic electronic component according to the present disclosure may include plating layers disposed on the first and second conductive layers, respectively, as necessary. The plating layer may be one layer or two or more layers, and may be formed by sputtering or electroplating, but is not limited thereto. A material for forming the plating layer is not particularly limited, and may include nickel (Ni), copper (Cu), tin (Sn), palladium (Pd), platinum (Pt), gold (Au), silver (Ag), tungsten (W), titanium (Ti), or lead (Pb) alone or alloys thereof.

Example and Comparative Example

In Example, a paste for external electrodes was prepared using a silver (Ag) and palladium (Pd) alloy having a weight ratio of 5 w % to 20 w % of palladium (Pd).

The prepared paste was applied to a prototype chip in which first and second base electrodes were formed of copper (Cu). As the prototype chip, a product for mass production (temperature characteristic X7R and capacity 220.0 nF) having a size of 16 mm×8 mm×8 mm was used.

The prototype chip to which the paste for manufacturing conductive layers was applied was fired at about 700° C. temperature for about 2 hours to prepare a prototype MLCC.

In the case of the Comparative Example, a prototype MLCC was manufactured under the same conditions as those of Example, except that palladium (Pd) was weighted to a content of 10 w %, and silver (Ag) powder particles and palladium (Pd) powder particles were mixed and used.

Figures 15, 16:
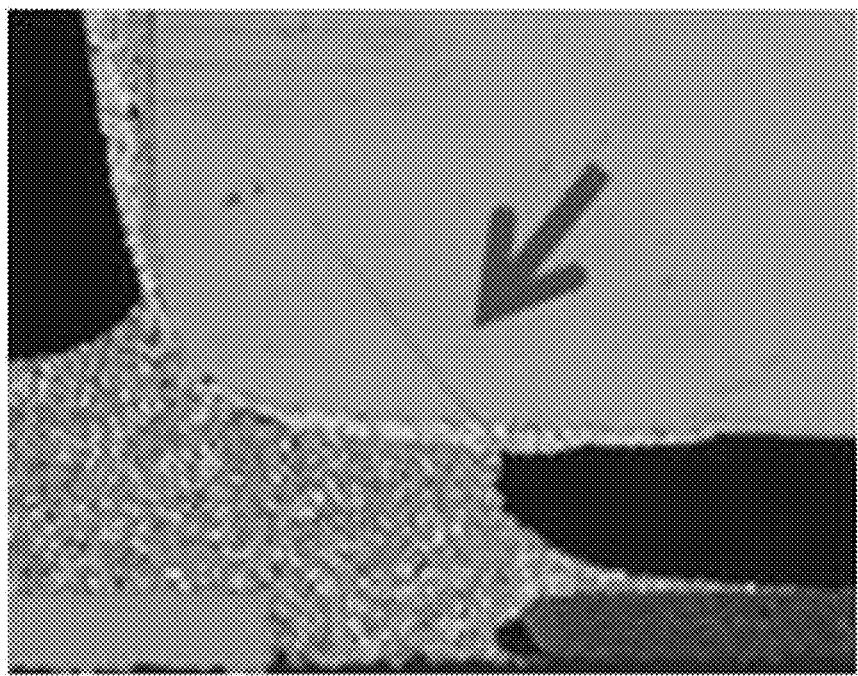
FIG. 15 is a captured image showing results of ion migration tests for Examples and Comparative Examples according to the present disclosure.
FIG. 16 is an image of a crack occurring in a component of the related art.

FIG. 15 shows the results of an ion migration test for the prototype MLCCs manufactured in Example and Comparative Example.

The ion migration test was conducted by dropping 1.3 ml distilled water between external electrodes at 25° C. and 1 atmospheric pressure and applying 15 V DC power to both external electrodes of the MLCCs. After power is applied, it is observed that dendrites of the silver (Ag) component grow from a negative (−) electrode to a positive (+) electrode of the MLCCs as the ion migration proceeds. The moment when both electrodes of the MLCCs were connected to the grown dendrites, a current of 1 mA or more flowed. This time was measured to compare the degrees of ion migration.

Referring to FIG. 15, in the case of Comparative Example, a current flow according to the dendrite growth was observed within about 30 seconds, but, in the case of Example, a current flow did not occur even after the lapse of 180 seconds. Through this, it can be seen that the multilayer ceramic electronic component according to the present disclosure has an excellent effect of suppressing ion migration.

As set forth above, according to exemplary embodiments of the present disclosure, an occurrence of ion migration of the multilayer ceramic electronic component may be suppressed.

In addition, economic efficiency may be improved by reducing the usage of a noble metal in the multilayer ceramic electronic component.

In addition, reliability of the multilayer ceramic electronic component may be improved.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body including a dielectric layer and first and second internal electrodes alternately stacked with the dielectric layer interposed therebetween;
a first external electrode connected to the first internal electrode and including a first base electrode disposed to be in contact with the ceramic body and a first conductive layer disposed on the first base electrode; and
a second external electrode connected to the second internal electrode and including a second base electrode disposed to be in contact with the ceramic body and a second conductive layer disposed on the second base electrode,
wherein the first conductive layer and the second conductive layer include silver (Ag) and palladium (Pd), and distribution positions of silver (Ag) and palladium (Pd) in central portions of the first conductive layer and the second conductive layer match at 95% or more according to a result of TEM mapping.

2. The multilayer ceramic electronic component of claim 1, wherein the first conductive layer and the second conductive layer include an alloy of silver (Ag) and palladium (Pd), and an average alloying rate of silver (Ag) and palladium (Pd) of the first conductive layer and the second conductive layer is 95% or more.

3. The multilayer ceramic electronic component of claim 2, wherein a content of palladium (Pd) of the alloy of silver (Ag) and palladium (Pd) is in a range from 1 wt % to 50 wt %.

4. The multilayer ceramic electronic component of claim 2, wherein the alloy of silver (Ag) and palladium (Pd) included in the first and second conductive layers includes a core-shell structure including a core portion and a shell portion and a homogenous alloy structure.

5. The multilayer ceramic electronic component of claim 4, wherein a content of palladium (Pd) of the core-shell structure is higher in the shell portion than in the core portion.

6. The multilayer ceramic electronic component of claim 4, wherein a content of palladium (Pd) of the homogeneous alloy structure has a certain weight ratio in the alloy region of silver (Ag) and palladium (Pd) of the first and second conductive layers.

7. The multilayer ceramic electronic component of claim 1, wherein the first and second conductive layers do not include a palladium (Pd) particle having a maximum particle diameter of 100 nm or more.

8. The multilayer ceramic electronic component of claim 1, wherein the first and second conductive layers include glass.

9. The multilayer ceramic electronic component of claim 8, wherein the glass is included in a range from 5 wt % to 15 wt % in the first and second conductive layers.

10. The multilayer ceramic electronic component of claim 8, wherein the glass is one or more selected from the group consisting of silicon oxide, boron oxide, aluminum oxide, transition metal oxide, alkali metal oxide, and alkaline earth metal oxide.

11. The multilayer ceramic electronic component of claim 1, wherein the first conductive layer is disposed to cover the first base electrode, and the second conductive layer is disposed to cover the second base electrode.

12. The multilayer ceramic electronic component of claim 1, wherein the first and second base electrodes include one or more conductive metals selected from the group consisting of nickel (Ni), copper (Cu), tin (Sn), palladium (Pd), platinum (Pt), iron (Fe), gold (Au), silver (Ag), tungsten (W), titanium (Ti), lead (Pb), and alloys thereof.

13. The multilayer ceramic electronic component of claim 1, further comprising a plating layer disposed on the first and second conductive layers.

14. A multilayer ceramic electronic component, comprising:
a ceramic body having first and second side surfaces opposing each other in a length direction;
first and second external electrodes respectively disposed on the first and second side surfaces, each of the first and second external electrodes comprising a base electrode layer disposed on corresponding side surface and a conductive layer disposed on the base electrode layer, the conductive layer comprising a silver palladium alloy having an average alloying rate of greater than 95%,
wherein alloying rate is defined a ratio B/A, wherein B is a weight of the silver palladium alloy and A is a sum of a total weight of silver and a total weight of palladium.

15. The multilayer ceramic electronic component of claim 14, wherein a content of palladium in the conductive layer is in a range from 1 wt % to 50 wt %.

16. The multilayer ceramic electronic component of claim 14, wherein the conductive layer further comprises a glass in a range from 5 wt % to 15 wt %.

17. The multilayer ceramic electronic component of claim 16, wherein the glass comprises an oxide of one or more selected from Si, B, Al, Zn, Ti, Cu, V, Mn, Fe, Ni, Li, Na, K, Mg, Ca, Sr, and Ba.

18. The multilayer ceramic electronic component of claim 14, further comprising a plating layer disposed on the conductive layer, the plating layer comprising one or more of Ni, Cu, Sn, Pd, Pt, Au, Ag, W, Ti, Pb and an alloy thereof.

* * * * *